Dec. 2, 1969  H. H. MARHAUER  3,481,509
MASS FLOW CONTROLLER
Filed Oct. 18, 1967  2 Sheets-Sheet 1

INVENTOR.
HANS H. MARHAUER
BY
ATTORNEYS

United States Patent Office 3,481,509
Patented Dec. 2, 1969

3,481,509
MASS FLOW CONTROLLER
Hans H. Marhauer, La Crescenta, Calif., assignor to The Procter & Gamble Company, Cincinnati, Ohio, a corporation of Ohio
Filed Oct. 18, 1967, Ser. No. 676,332
Int. Cl. G01f *11/00;* B67d *5/08*
U.S. Cl. 222—1           6 Claims

ABSTRACT OF THE DISCLOSURE

An automatic system for monitoring and controlling the rate of mass flow from a reservoir by a continuous measurement of the weight of the reservoir and its contents and the differentiation of that weight signal with respect to time to provide an instantaneous flow signal which is compared with a predetermined set point value and on the basis of which changes in the mass flow from the reservoir are accomplished. The system incorporates an electronic differentiating circuit and includes control and logic circuits to provide refilling of the reservoir when the level has reached a predetermined value.

BACKGROUND OF THE INVENTION

The accurate control of flow rate on a weight basis is an important requirement in many chemical processes and operations. The usual method of measuring weight flow rate involves the measurement of the volume rate of flow of the material by the use of existing flow measuring devices such as nutating disc meters, rotameters, venturi meters, orifices, weirs, and the like. If the density of the material remains constant, then the volumetric flow rate is directly proportional to the mass flow rate and a conversion of one to the other can readily be made if the density is known. If, on the other hand, the density of the material is variable, either by reason of temperature changes or changes in the character of the material, the volumetric flow rate is no longer readily converted into mass flow rate, at least not during the time the character of the material is changing. For example, if a liquid material which has air entrained therein is to be measured on a weight flow basis, it is necessary that the weight be sensed directly in order to insure that the loss of some of the entrained air does not affect the process to which the material is being supplied. A volumetric measurement of the flow would not provide the desired mass flow rate. In such instances it is necessary that mass flow rate be measured and controlled directly, rather than indirectly by means of sensing volumetric flow rate.

Prior systems for controlling mass flow rate have generally involved the instantaneous comparison of the weight of the reservoir in which the material is contained, with the instantaneous value of a moving set point which is arranged so that the time rate of weight change which takes place corresponds to the desired mass flow rate. Such a system is described in U.S. Patent 2,544,155, granted Mar. 6, 1951, to R. J. Harkenrider. In that system a balance scale is used with the reservoir so arranged that the scale measures the weight of the reservoir and its contents. A moving counterpoise, which may be moved by a motor-driven lead screw, moves at a predetermined rate to furnish the instantaneous set point. Any unbalance in the system is sensed by a switch connected to the balance beam of the scale and closes a circuit to cause an adjustment of the flow rate until the balance beam of the scale is brought back into balance with the moving set point.

The primary shortcoming of the moving weight system is reflected in the fact that the system itself is expensive due to the sensitive mechanical equipment required. In addition, the reservoir must be manually refilled and the system balanced at some initial point after each time the reservoir is emptied. Furthermore, the accuracy of the system is principally dependent upon the constancy of the density of the fluid and if slight variations in density do occur, the system will not respond quickly to bring the weight change into line with the desired flow rate. As a matter of fact, this system will cause the flow rate to oscillate about the desired level should a change in density occur, and it may take a considerable period of time before these oscillations are damped out and the actual flow matches the desired set point value.

SUMMARY OF THE INVENTION

Briefly stated, in accordance with one aspect of the present invention, an automatic mass flow control system is provided for batch operation in the control of mass flow rate of fluent materials of variable density. A reservoir is provided for receiving a fixed quantity of the material to be metered. Transducer means are provided for converting the weight of the reservoir and its contents into an electrical signal proportional thereto. The electrical signal so generated is amplified and supplied to an electrical circuit which differentiates the weight signal with respect to time in order to provide a signal proportional to the mass flow rate of the material leaving the reservoir. The mass flow rate signal is amplified and supplied to a controller which compares the measured mass flow rate with the desired mass flow rate and initiates an error signal reflecting the deviation between the measured value and the desired value. The error signal is supplied to a flow control means to adjust the actual mass flow rate so that it coincides with the desired value.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

DESCRIPTION OF THE PREFERRED EMBODIMENTS

Figure 1:
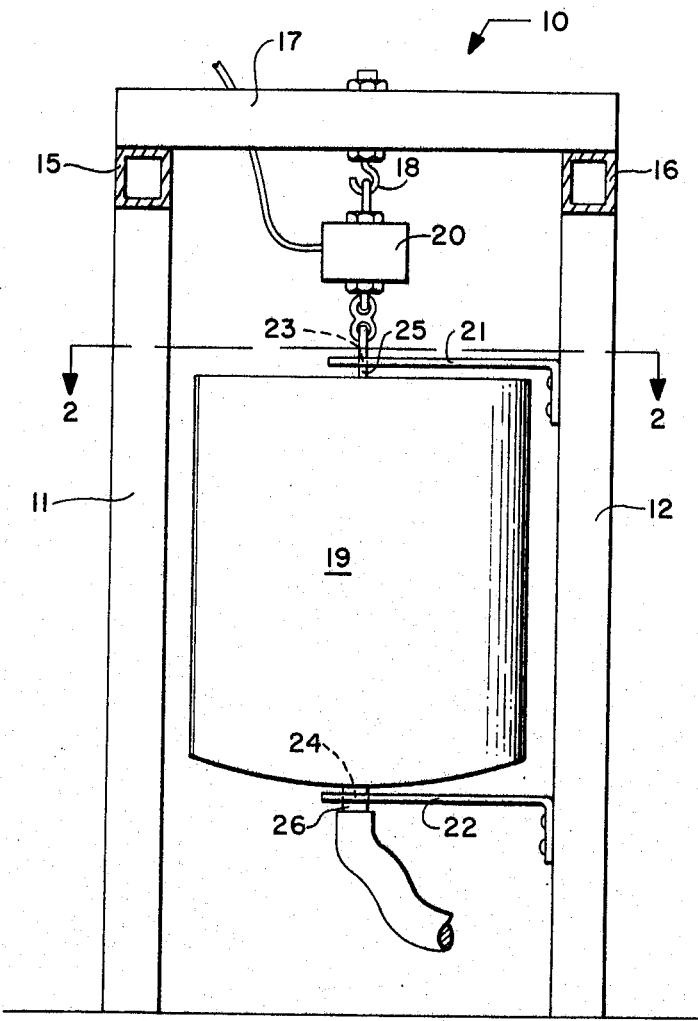
FIGURE 1 is an elevational view of a reservoir and its associated mounting system which is suitable for use with the present invention.
Figure 2:
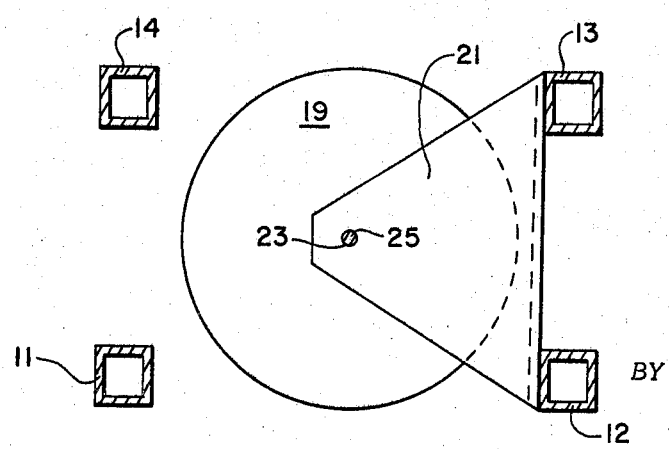
FIGURE 2 is a view along line 2—2 of FIGURE 1 showing the configuration of the check plates.

Referring to the drawings and particularly to FIGURES 1 and 2, there is shown a reservoir support frame 10 comprising upright members 11, 12, 13, and 14, and cross members 15 and 16 on which is positioned overhead beam 17. Overhead beam 17 has a suitable suspending means such as eye hook 18 from which reservoir 19 is suspended through transducer 20. Transducer 20 converts the weight of reservoir 19 and its contents into an electrical signal proportional thereto and can be either a piezoelectric type or it can be a load cell based on resistance strain gauges. A suitable transducer of the latter type is manufactured by the Toledo Scale Corporation under Part No. T49645, a tension-type cell which has a capacity of 1000 pounds. Although shown in FIGURE 1 in the position whereby the load cell is under a tensile load and is thus a tension-type load cell, the reservoir can be so mounted that transducer 20 is under a compressive load and a suitable compression-type load cell can be employed in that configuration.

In order to preclude horizontal motion of the reservoir 19, check plates 21 and 22 are provided and are mounted so that their faces lie in planes transverse the axis of reservoir 19. Check plates 21 and 22 are each securely anchored to at least two of upright members 11, 12, 13, or 14 and are provided with apertures 23 and 24, respectively, through which a correspondingly-sized cylindrical element, such as guides 25 and 26, can pass. The guides 25 and 26, which are securely and, preferably, axially affixed to reservoir 19, are adapted to be axially moveable within apertures 23 and 24 with a minimum of lateral clearance. Guide 26 can also serve as the discharge pipe from reservoir 19.

The above-described arrangement effectively prevents horizontal motion of reservoir 19, which motion would otherwise impose an extraneous and undesirable force component on transducer 20. In connection with extraneous signals, it is preferable to mount transducer 20 so that it is isolated from low frequency oscillations, i.e., those having a frequency of about 10 cycles per second or less. Vibration and horizontal motion of reservoir 19 are undesirable in that they result in additional signals which are superimposed on the weight signal. When the output of transducer 20 is amplified to increase the signal strength, the extraneous signals would also be amplified and tend to distort the weight signal. Furthermore, if the transducer output is differentiated, the extraneous signals would be further magnified, since they are changing more rapidly than the weight signal and the derivatives of the extraneous signals would be higher than that of the weight signal, thus obscuring the latter.

Figure 3:
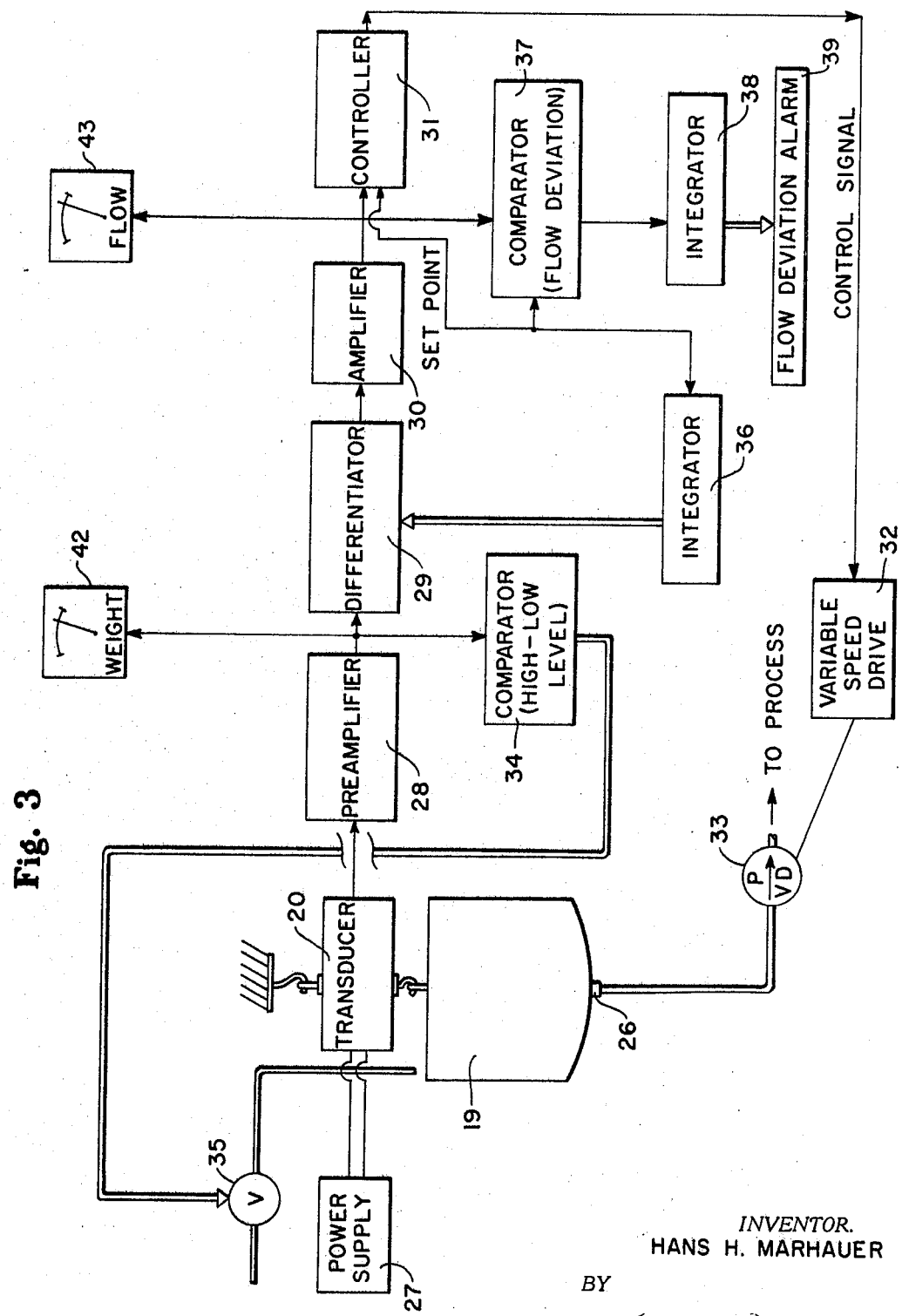
FIGURE 3 is a block diagram showing the interconnection of the various elements of the control system forming the present invention.

The overall system is shown in block diagram form in FIGURE 3. Reservoir 19 is suspended from transducer 20 which, in turn, is suspended from some rigid support such as that shown on FIGURES 1 and 2. A source of power 27 is connected to transducer 20 to serve as the necessary excitation. The output of transducer 20 is an electrical signal which is proportional to the instantaneous value of the weight of reservoir 19 and its contents. This output signal is connected to preamplifier 28 which amplifies the signal. The output from preamplifier 28 is connected to differentiator 29, which differentiates the weight signal to provide an output therefrom proportional to the derivative of the weight signal with respect to time or, in effect, a signal proportional to mass flow. The differentiated weight signal, or flow rate, is amplified by amplifier 30, the output of which is connected to controller 31, which is a conventional proportional plus reset controller. Controller 31 compares the flow rate signal with the set point, which is the desired flow rate, and initiates a suitable error signal, if necessary, to control the flow control component, which can be a variable speed drive 32 for a positive displacement pump 33, or it can be a control valve (not shown). The foregoing elements comprise the primary control loop of the present invention.

A preamplifier which is suitable for use with the strain gauge-type transducer described above is a high gain amplifier designed to convert direct-current signals in the millivolt range to the level required by subsequent elements of the system. A suitable preamplifier for use with the abovedescribed transducer is manufactured by the Devar-Kinetics Division of Consolidated Electrodynamics Corporation and is designated Type 19–101A. If a transducer of a different type is used, however, it may not be necessary that the output of that transducer be further amplified for the components of the system which follow. Preferably, the preamplifier is arranged so that its output increases as the reservoir is emptied so that the differentiated signal will be positive.

The differentiator takes the amplified weight signal and differentiates it with respect to time to provide a signal which is proportional to the time rate of change of weight, or computed mass flow rate. A suitable device for accomplishing the differentiation of the weight signal from the above-described preamplifier is manufactured by Devar-Kinetics and designated Type 19–407. This differentiator comprises two operational amplifiers; the first differentiates the input signal and the second inverts the differentiated signal so that both input and output voltages are of the same sign. Frequencies above about 1 cycle per second are attenuated by means well known to those skilled in the art in order to eliminate the effects of undesirable signals such as those caused by the vibration of nearby machinery.

The differentiator output is applied to amplifier 30 to bring the output to a level suitable for use by controller 31. A suitable amplifier for this purpose is Devar-Kinetics Type 19–301, which is essentially a two-stage amplifier. Thus the output from amplifier 30 is the amplified, computed flow signal.

The amplified, computed flow signal is then compared with a reference flow value, or set point (see FIGURE 3), to produce an error signal which is conditioned by a conventional proportional plus reset controller 31. The latter provides the control signal for the final control element, which may be a pneumatically operated control valve (not shown) which is provided with a pneumatic signal by an electrical to pneumatic transducer (not shown) or a variable speed drive 32 for a positive displacement pump 33. A controller which has been found to be satisfactory in conjunction with the above-described elements is Devar-Kinetics Type 18–402, which is essentially a proportional plus reset controller.

Optionally, indicators 42 and 43 may be incorporated in the circuit after the preamplifier and after the amplifier, respectively, to provide direct indication of reservoir weight and computed flow, respectively.

In addition to the analog control loop described above, various logic and alarm circuits can be added to permit automatic refilling of reservoir 19 and to provide various visual or audible alarms to alert the operator to the occurrence of undesriable conditions in the system. For example, a comparator 34 can be connected to the output of preamplifier 28 to initiate refilling of reservoir 19 when the weight of the reservoir and its contents reaches a predetermined level. Similarly, the refilling of reservoir 19 can be terminated when the weight of the reservoir plus its contents reach a second predetermined level. A suitable comparator for performing these functions is Devar-Kinetics Type 19–501 which is a two-channel comparator on which both a high and a low reservoir level can be set. By connecting the output of the comparator to suitable relays (not shown) in a manner well known to those skilled in the art, a refill valve such as valve 35 can be actuated and controlled to refill reservoir 19. For example, when reservoir 19 reaches the pre-determined low level, the comparator 34 can activate a relay to energize the circuit and thereby open valve 35. When the reservoir weight has reached the predetermined high level, the relay can be de-energized by comparator 34, thereby closing valve 35 and precluding further flow into reservoir 19.

During the time that reservoir 19 is being refilled, the weight as shown by the preamplifier output is increasing rapidly rather than decreasing slowly. This, if uncorrected, would result in a large negative derivative signal causing the controller to provide the wrong flow. It is desirable to maintain the flow during the refill period at or at least near the set point. This can be done in two ways with the particular controller used. The relay used to initiate and sustain refill can actuate a "hold" circuit in the controller which will then maintain its last output signal through the refill, or the relay can be arranged to automatically switch the controller to manual operation for this period of time. Both approaches are satisfactory. The selection of which approach to follow is a function of the average density during refill. The sharp upset on completion of refill when the derivative of the weight (flow rate) changes rapidly from the high negative slope refilling signal to the positive slope emptying signal can be minimized by imposing an interim ramp signal on the differentiator. This signal should match the normal flow signal in both slope and magnitude while the refilling operation is taking place. This can be accomplished by using a refill relay contact to switch the differentiator input from preamplifier 28 output to integrator 36 output during refill. The integrator is driven, with a suitable time constant, by the setpoint to provide an input signal to differentiator 29 simulating the normal flow signal. When the initial condition of the integrator is properly set, the output of integrator 36 and output of preamplifier 28 are equal in magnitude and slope when reservoir refilling is complete. No upset to the differentiator output is caused by switching the differentiator input back to the preamplifier output at this time, provided the signals are matched. This switching is performed by a refill relay (not shown).

In addition to providing means for refilling reservoir 19, various alarms or signals can be provided to alert the operator to the existence of abnormal conditions within the system. For example, as shown in FIGURE 3, both the set point voltage and the computed flow can be connected to comparator 37, which can be set so that a deviation of more than a preset percentage from the set point flow rate, such as, for example, 1%, will cause the relay associated with the pertinent comparator channel to close a contact, which provides an input voltage to integrator 38. If the error exists for more than the present period, the output of integrator 38 will reach a level high enough to operate alarm 39. A suitable comparator for this purpose is Devar-Kinetics Type 19–508, which is a two-channel, absolute value deviation comparator. A suitable integrator is Devar-Kinetics Type 19–407. This particular part of the circuit also provides an alarm if reservoir 19 runs empty because of refill circuit malfunction.

An additional alarm can be provided to warn the operator if the refilling operation takes longer than it should. For example, a time delay relay can be connected to the output side of comparator 34 and can be set to sound an alarm a given period of time after refilling should have been completed. If refilling is completed before the delay time expires, the delay timer simply returns to its initial position without closing the alarm circuit. A suitable time delay relay for this purpose is Amperite Type 115, No. 120, manufactured by Amperite Co., Inc., Union City, N.J.

While particular embodiments of the invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed is:

1. Apparatus for controlling the rate of flow of fluent materials from a reservoir having flow control means at its discharge, said apparatus comprising:
   (a) a transducer disposed to register the weight of said reservoir, said transducer having means for transforming the weight of said reservoir and its contents into a corresponding electrical signal proportional thereto;
   (b) a differentiating circuit connected to said transducer, said differentiating circuit having an input for receiving the electrical input signal to be differentiated and an output for providing an electrical signal proportional to the time derivative of said input signal;
   (c) a controller connected to the output of said differentiating circuit and having an adjustable set point flow value, said controller having a correction signal as output, said correction signal being determined by and proportional to the difference between said time derivative and said set point flow value; and
   (d) means responsive to and controlled by said correction signal to adjust said flow control means to provide the desired mass flow rate.

2. The apparatus of claim 1 wherein said transducer is a resistance strain gauge load cell.

3. The apparatus of claim 1 wherein said controller is of the proportional plus reset type.

4. The apparatus of claim 1 wherein said flow control means comprises:
   (a) a transducer for converting the output signal of said controller from an electrical signal to a pneumatic signal; and
   (b) an air-operated flow control valve positioned on said reservoir and adapted to receive a pneumatic signal to control the degree of opening of said valve.

5. The apparatus of claim 1 wherein said flow control means comprises a variable speed drive connected to a positive displacement pump.

6. A method for controlling the rate of mass flow of material from a reservoir comprising:
   (a) converting the weight of said reservoir and its contents into an electrical signal proportional thereto;
   (b) differentiating said weight signal with respect to time to provide a signal proportional to the time rate of change of weight;
   (c) comparing said rate signal with a predetermined set point flow value;
   (d) generating an error signal based on the difference between said set point flow value and said rate signal; and
   (e) adjusting a flow control means in response to said error signal.

References Cited

UNITED STATES PATENTS

| | | | |
|---|---|---|---|
| 3,319,828 | 5/1967 | Maxwell | 222—58 X |
| 2,650,057 | 8/1953 | Goland et al. | 222—58 X |
| 3,107,820 | 10/1963 | Turner | 222—58 |
| 3,329,311 | 7/1967 | Goff et al. | 222—58 X |
| 3,329,313 | 7/1967 | Mayer | 222—58 |

ROBERT B. REEVES, Primary Examiner

H. S. LANE, Assistant Examiner

U.S. Cl. X.R.

222—58